(12) United States Patent
Clossen-von Lanken Schulz et al.

(10) Patent No.: US 10,962,359 B2
(45) Date of Patent: Mar. 30, 2021

(54) ULTRASOUND MEASURING ASSEMBLY AND METHOD FOR DETECTING THE WALL THICKNESS OF A PIPE

(71) Applicant: Siemens Aktiengesellschaft, Munich (DE)

(72) Inventors: Michael Clossen-von Lanken Schulz, Issum (DE); Stefan Frank, Herten (DE); Philipp Kahlert, Solingen (DE); Stefan Nendel, Hessdorf (DE); Stefan Obermayr, Duisburg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 118 days.

(21) Appl. No.: 16/462,953

(22) PCT Filed: Nov. 2, 2017

(86) PCT No.: PCT/EP2017/078067
§ 371 (c)(1),
(2) Date: May 22, 2019

(87) PCT Pub. No.: WO2018/099682
PCT Pub. Date: Jun. 7, 2018

(65) Prior Publication Data
US 2019/0277631 A1 Sep. 12, 2019

(30) Foreign Application Priority Data
Nov. 30, 2016 (DE) .................... 10 2016 223 807.8

(51) Int. Cl.
*G01B 17/02* (2006.01)
(52) U.S. Cl.
CPC .................................. *G01B 17/02* (2013.01)

(58) Field of Classification Search
CPC .... G01B 17/02; A61B 1/00; G01N 2015/142; G01N 29/24; G01N 30/76; G01N 2203/0658
(Continued)

(56) References Cited

U.S. PATENT DOCUMENTS

| 3,924,453 A | 12/1975 | Clark et al. |
| 2007/0089544 A1 | 4/2007 | Bagley et al. |

(Continued)

FOREIGN PATENT DOCUMENTS

| CN | 201053880 Y | 4/2008 |
| DE | 1001505 A | 1/1957 |

(Continued)

OTHER PUBLICATIONS

PCT International Search Report and Written Opinion of International Searching Authority dated Feb. 16, 2018 corresponding to PCT International Application No. PCT/EP2017/078067 filed Nov. 2, 2017.

(Continued)

*Primary Examiner* — Tarun Sinha
(74) *Attorney, Agent, or Firm* — Schmeiser, Olsen & Watts LLP

(57) ABSTRACT

A measuring assembly for detecting the wall thickness of a pipe, including an ultrasonic probe and a testing head with a main element which receives an ultrasonic probe and the lower face of which defines a main element support surface is provided. The testing head has two wing elements, the lower face of each of which defines a wing element support surface and which are held on the main element in a pivotal manner about pivot axes extending substantially parallel to one another in a longitudinal direction such that the wing element support surfaces can be moved towards each other and away from each other. The wing elements are connected (Continued)

via synchronizing means such that the pivotal movements of the wing elements about the corresponding pivot axes are carried out in a synchronous manner. An associated method is also provided.

9 Claims, 6 Drawing Sheets

(58) Field of Classification Search
USPC .......................................................... 73/644
See application file for complete search history.

(56) References Cited

U.S. PATENT DOCUMENTS

| | | | |
|---|---|---|---|
| 2009/0112509 | A1 | 4/2009 | Batzinger et al. |
| 2012/0167688 | A1* | 7/2012 | Minachi ................. G01N 29/46 73/602 |
| 2014/0060195 | A1 | 3/2014 | Yamano et al. |
| 2014/0076053 | A1* | 3/2014 | Gaudet ................. G21C 17/017 73/588 |

FOREIGN PATENT DOCUMENTS

| | | |
|---|---|---|
| DE | 2420094 A1 | 2/1975 |
| EP | 1772949 A1 | 4/2007 |
| GB | 739998 A | 11/1955 |
| JP | 2001194352 A | 7/2001 |
| JP | 2007130710 A | 5/2007 |
| JP | 2012103153 A | 5/2010 |
| JP | 2012103153 A | 5/2012 |
| KR | 101483551 B1 | 1/2015 |
| WO | 2009055110 A1 | 4/2009 |
| WO | WO 2009055110 A1 | 4/2009 |

OTHER PUBLICATIONS

Non-English German Search Report for Application No. 10 2016 223 807.8, dated Jun. 16, 2017.

PCT International Search Report and Written Opinion of International Searching Authority dated Feb. 16, 2016 corresponding to PCT International Application No. PCT/EP2017/078067 filed Nov. 2, 2017.

Indian Office Action dated Jan. 5, 2021 for Application No. 201917018893.

* cited by examiner

ULTRASOUND MEASURING ASSEMBLY AND METHOD FOR DETECTING THE WALL THICKNESS OF A PIPE

CROSS-REFERENCE TO RELATED APPLICATIONS

This application claims priority to PCT Application No. PCT/EP2017/078067, having a filing date of Nov. 2, 2017, which is based on German Application No. 10 2016 223 807.8, having a filing date of Nov. 30, 2016, the entire contents both of which are hereby incorporated by reference.

FIELD OF TECHNOLOGY

The following relates to a measuring arrangement for detecting the wall thickness of a pipe, comprising a testing head with a main body which receives an ultrasound probe and which, at its underside, defines a main body support surface. The following furthermore relates to a method for detecting the wall thickness of a pipe using a measuring arrangement of the type.

BACKGROUND

It is basically known from the prior art to detect the wall thickness of a pipe by means of ultrasound. In this context, various measuring arrangements are known which normally have a main body which receives an ultrasound probe and which, at its underside, defines a main body support surface which, in order to detect the wall thickness of a pipe, is mounted onto the outer side of the pipe. Such a main body with integrated ultrasound sensor is commonly also referred to as testing head. The principle of the ultrasound measurement is known to a person skilled in the art, and this will therefore not be discussed in any more detail below.

A problem in the detection of the wall thickness of a pipe using a measuring arrangement of the type mentioned in the introduction consists, owing to the rounding of the pipe, in holding the main body support surface normal to the surface of the pipe, which is necessary in order to achieve correct measurement results. In the case of easily accessible pipes, this problem can duly be substantially eliminated through corresponding training of the personnel carrying out the measurement. However, in the detection of the wall thickness of poorly accessible pipe portions, or of pipe portions which are not visible, carrying out correct wall thickness measurements is scarcely possible even by trained personnel.

Proceeding from this known art, it is an aspect of embodiments of the present invention to provide a measuring arrangement of the type mentioned in the introduction, by means of which correct positioning of the main body support surface on the surface of a pipe to be tested is easily possible even for untrained personnel. A further aspect of embodiments of the present invention furthermore consists in creating a measuring arrangement of the type mentioned in the introduction with which even wall thicknesses of poorly accessible pipes or pipe portions, and/or of pipes or pipe portions which are not visible, can be easily detected.

SUMMARY

An aspect relates to a measuring arrangement of the type mentioned in the introduction, which is distinguished by the fact that the testing head has two wing elements which, at their undersides, define in each case one wing element support surface and which are held on the main body pivotably about pivot axes which extend substantially parallel to one another and in a longitudinal direction, in such a way that the wing element support surfaces can be moved toward one another and away from one another, wherein the wing elements are connected to one another by synchronizing means, in particular in the form of intermeshing synchronizing toothings, in such a way that their pivoting movements about the associated pivot axes occur synchronously. To carry out a wall thickness measurement of a pipe, both the main body support surface of the main body and the wing element support surfaces of the two wing elements are pressed against the surface of the pipe, which, owing to the synchronized pivoting movements of the wing elements about their associated pivot axes, has the effect that the wing element support surface is automatically mounted normally onto the surface of the pipe. This results in very accurate and reproducible positioning of the ultrasound probe, without the need for specially trained personnel. A major source of errors in the wall thickness measurement is thus eliminated, which leads to very reliable measurement results.

In one refinement of embodiments of the present invention, the ultrasound probe is inserted from above into a passage opening provided in the main body, resulting in particular in a simple construction of the main body.

The measuring arrangement is distinguished by the fact that a contact surface of the ultrasound probe extends substantially parallel and with a small spacing with respect to the main body support surface, wherein the spacing amounts to in particular less than 1 mm, and that the main body support surface has a contact means receiving depression which annularly surrounds the contact surface of the ultrasound probe and which is connected, via a contact medium channel which extends through the main body, to a contact medium feed opening of the main body, wherein the depth of the contact medium receiving depression amounts to in particular less than 1 mm. Owing to the fact that the contact surface of the ultrasound probe is offset inward in relation to the main body support surface and is surrounded by a contact medium receiving depression of annular form, it can be ensured that, when a wall thickness measurement is being carried out, the contact surface of the ultrasound probe is correctly wetted with the contact medium, which normally has a gel-like consistency, wherein only a small amount of contact medium is consumed. With the stated magnitudes of the spacing between the contact surface of the ultrasound probe and the main body support surface and/or of the depth of the contact medium receiving depression, particularly good results have been achieved.

It is advantageous for at least one magnet to be arranged on the main body support surface and/or on the wing element support surfaces, in each case at least two magnets, which are spaced apart from one another in the longitudinal direction. This has the effect that, at least in the case of pipes which are produced from a magnetic material, a substantially automatic orientation of the main body support surface or of the ultrasound probe occurs, which is highly advantageous in particular in the case of wall thickness measurements on poorly accessible pipe portions and/or poorly visible pipe portions.

It is preferable for the wing element support surfaces to each be provided with a depression which is in particular of elongate form and extends in the longitudinal direction. Owing to such depressions, even wall thicknesses of pipe portions which, as viewed in the longitudinal direction of the pipe, are situated in the region of pipe curves can be correctly detected. The dimensions of the depression are advantageously adapted to the radii of curvature present on the pipes, such that at least two-point support of the wing receiving surfaces on the pipe surface is ensured at all times.

The height of the testing body in at least one pivoting position of the wing elements is advantageously no greater than 10 mm, such that the testing head can be moved even through narrow gaps.

It is preferable for a holding rod to be fastened by means of an articulated connection to the main body, wherein the articulated connection permits a relative pivoting of the main body and of the holding rod about a holding rod pivot axis extending in the longitudinal direction. With such a rod, the main body with the wing elements held thereon can be moved even to otherwise poorly accessible positions.

The holding rod and the articulated connection advantageously define fluid channels which are fluidically connected to one another and to a contact means feed opening arranged on the main body. Correspondingly, contact medium can be fed to the main body or to the main body support surface via the holding rod, the articulated connection and the contact means feed opening. If the fluid channel of the holding rod extends through the entire holding rod, it is for example possible for contact medium to be fed by being injected using a syringe into the free end of the holding rod.

The embodiments furthermore create a method for detecting the wall thickness of a pipe using a measuring arrangement according to embodiments of the invention of the type described above, wherein the pipe is in particular a pipe of a heat recovery steam generator of a steam turbine.

BRIEF DESCRIPTION

Some of the embodiments will be described in detail, with references to the following Figures, wherein like designations denote like members, wherein.

DETAILED DESCRIPTION

Figure 1:
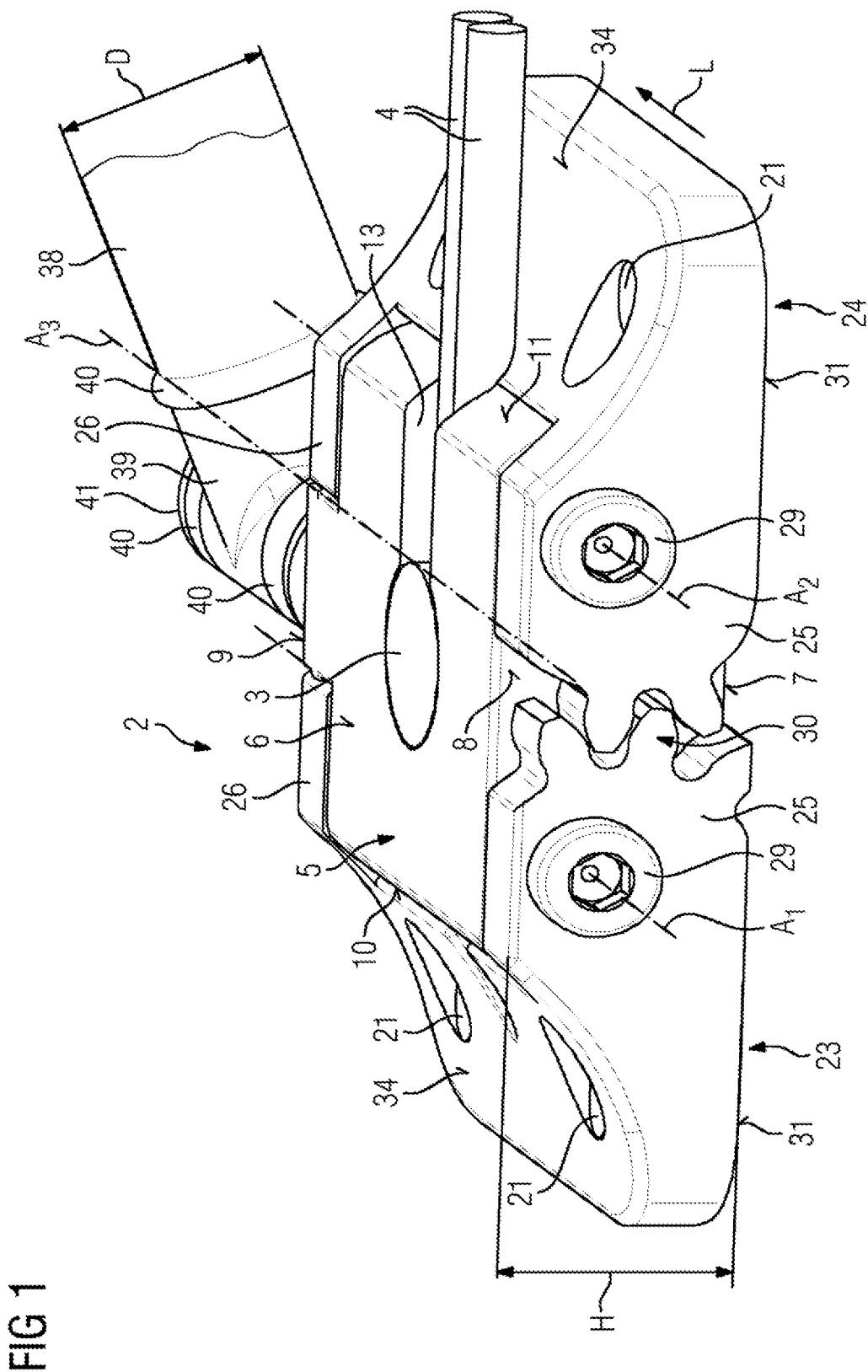
FIG. 1 shows a perspective view of a testing head of a measuring arrangement according to a first embodiment of the present invention, wherein wing elements of the testing head are situated in a first pivoting position.
Figure 2:
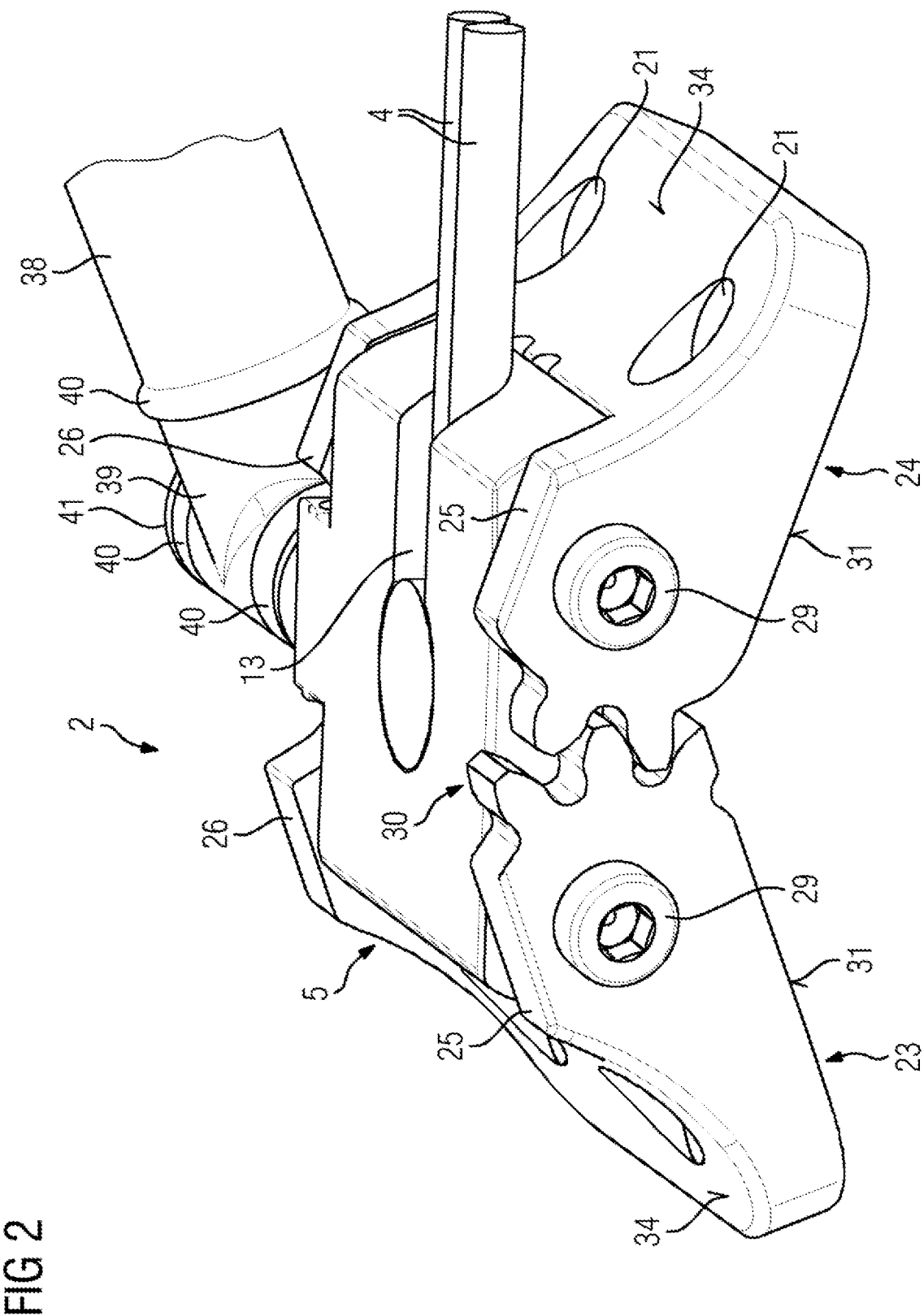
FIG. 2 shows a first perspective partial view of the testing head shown in FIG. 1, wherein the wing elements are situated in a second pivoting position.
Figure 3:
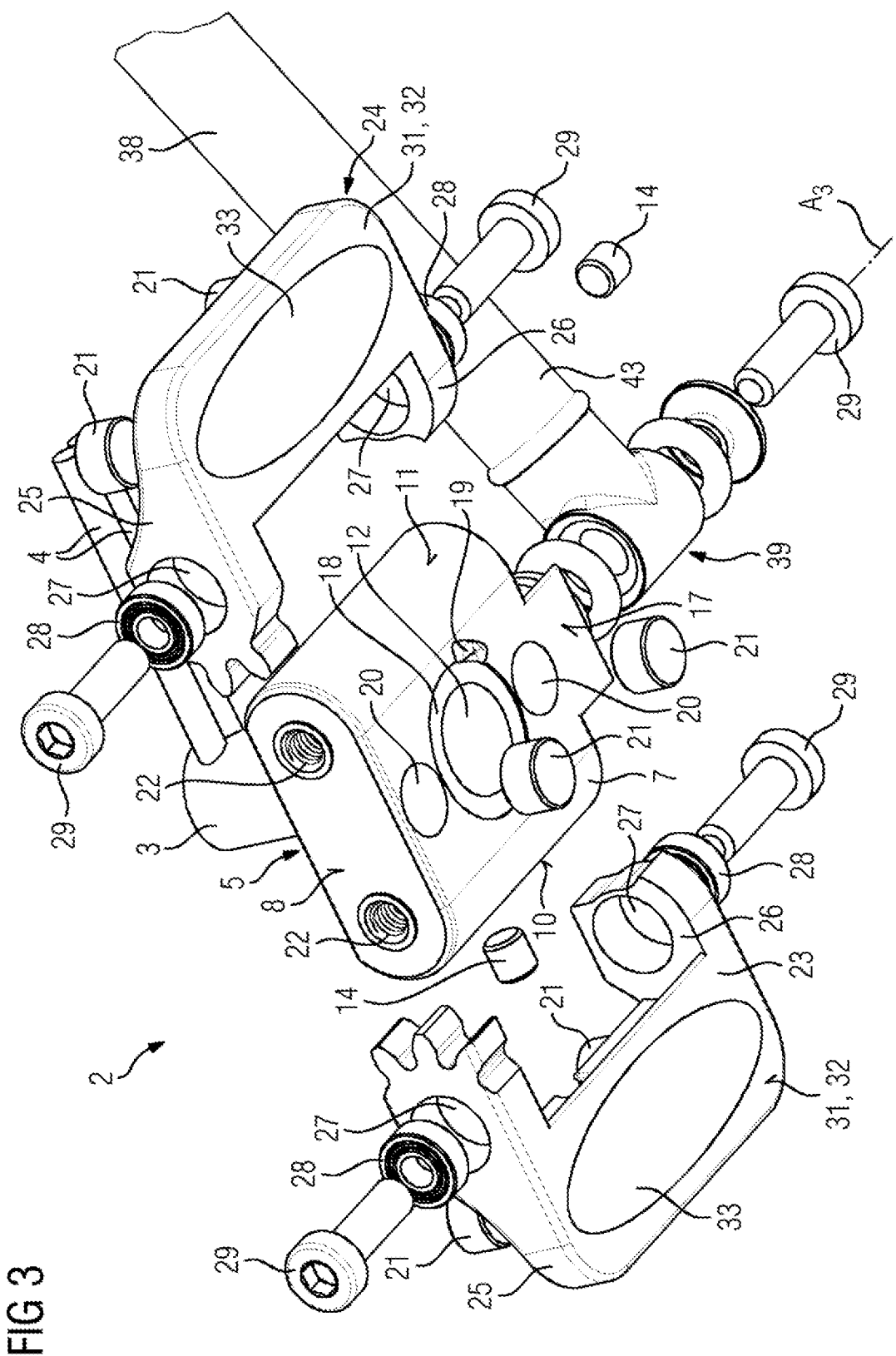
FIG. 3 shows a perspective exploded view of the testing head shown in FIG. 1 from below.
Figure 4:
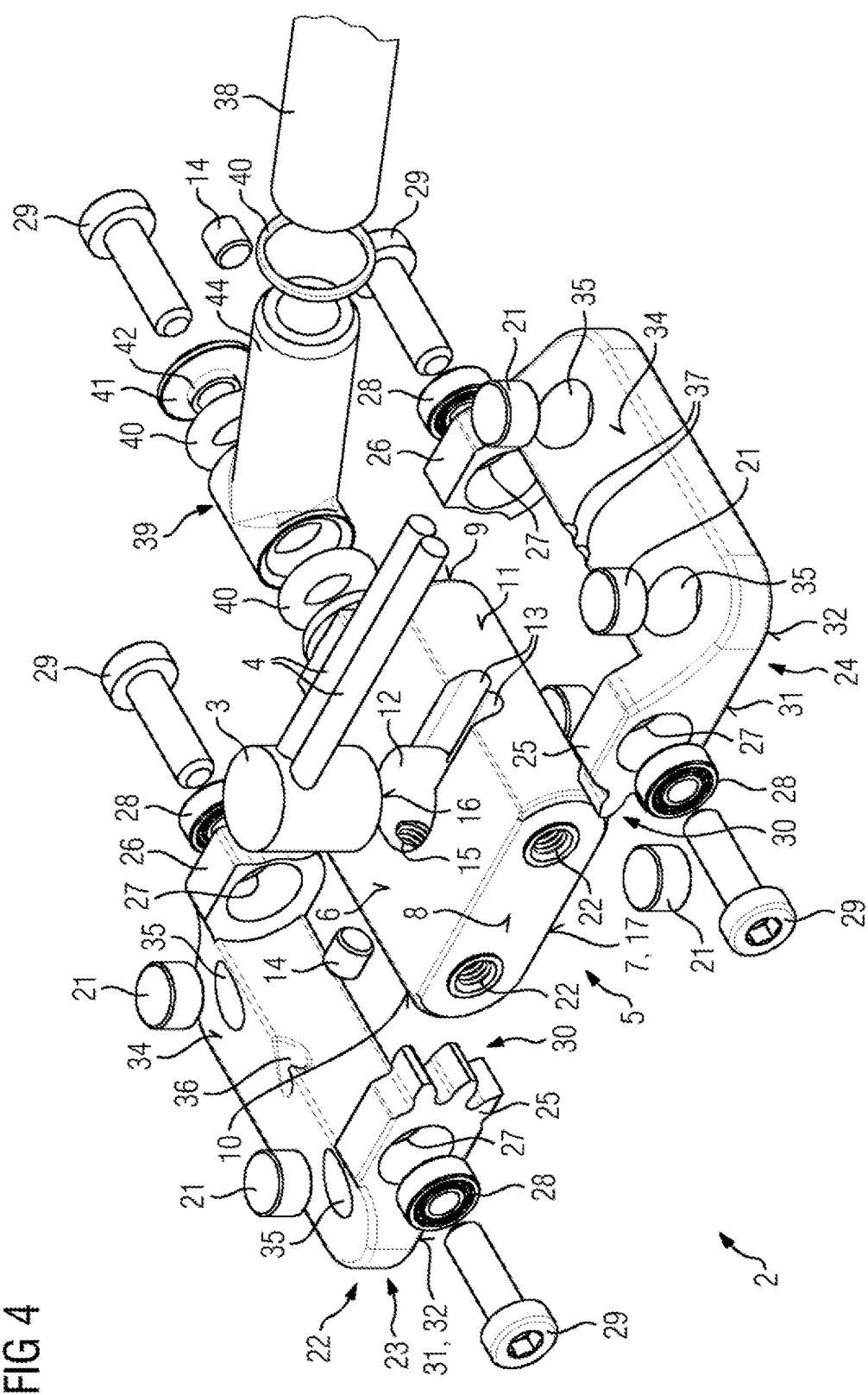
FIG. 4 shows a perspective exploded view of the testing head shown in FIG. 1 from above.
Figure 5:
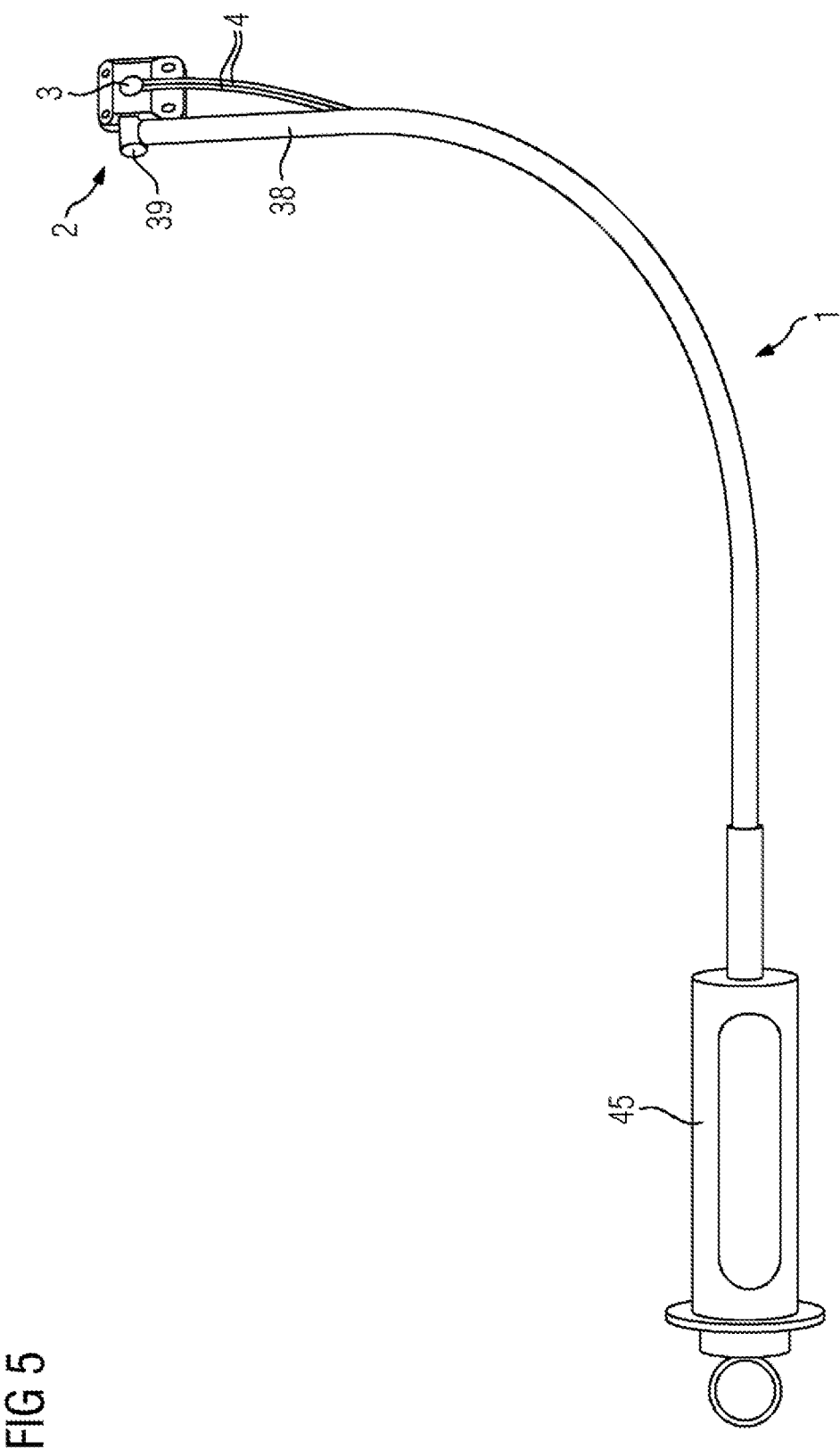
FIG. 5 shows a plan view of the measurement arrangement as a whole.

FIGS. 1 to 5 show a measuring arrangement 1 according to embodiments of the present invention, or components thereof. The measuring arrangement 1 comprises a testing head 2 with an ultrasound probe 3, which in the present case has a substantially cylindrical housing, out of the shell surface of which the associated cables 4 are led in the upper region. Furthermore, the testing head 2 comprises a main body 5 which receives the ultrasound probe 2 and which is of substantially cuboidal form and which extends in a longitudinal direction L. The main body 5 comprises a top side 6, an underside 7, mutually oppositely situated end sides 8 and 9, and mutually oppositely situated longitudinal sides 10 and 11, which, as viewed in cross section, are provided with a uniform rounding. Substantially centrally, a cylindrical passage opening 12 extends from the top side 6 to the underside 7, into which passage opening cable receiving grooves 13 open as viewed from above, which cable receiving grooves extend from the longitudinal side 11 in the direction of the passage opening 12. The ultrasound probe 3 with the cables 4 held thereon is inserted from above into the passage opening 12 and the cable receiving grooves 13 and is fixed by means of a grub screw 14 which is screwed into a threaded passage bore 15 which extends from the longitudinal side 10 to the passage opening 12. The ultrasound probe 3 is positioned within the passage opening 12 such that its contact surface 16 extends substantially parallel and with a small spacing with respect to a main body support surface 17, which is defined by the underside 7 of the main body 5. The spacing corresponds in the present case to the depth of a contact medium receiving depression 18 which annularly surrounds the passage opening 12 and thus the ultrasound probe 3 inserted therein, wherein the spacing or the depth amounts to less than 1 mm. A contact medium channel 19 which extends through the main body 5 opens circumferentially into the contact medium depression 18, which contact medium channel opens out approximately centrally on the end side 9 of the main body 5, where it forms a contact medium feed opening (not illustrated in any more detail). On the main body support surface 17, to both sides of the contact medium depression 18 and in alignment therewith in the longitudinal direction L, two receiving openings 20 are formed in the main body 5, into which receiving openings magnets 21 are inserted and fastened, in the present case using an adhesive. At the end sides 8 and 9, there are provided in each case two threaded bores 22, which are arranged in alignment with one another in the longitudinal direction L.

The testing head 2 furthermore comprises two wing elements 23 and 24, which are held pivotably on the main body 5 and which extend along the longitudinal sides 10 and 11 of the main body 5. The wing elements 23 and 24 have a substantially mirror-symmetrical construction and comprise in each case two pivot arms 25 and 26, which engage around the end sides 8 and 9 of the main body 5, wherein each pivot arm 25, 26 is equipped with a passage bore 27 which is aligned with one of the threaded bores 22 which are provided in the end sides 7, 8 of the main body 4. Ball bearings 28 are inserted in each case into the passage bore 27, which ball bearings are extended through by fastening screws 29, which in turn are screwed into the threaded bores 22 of the main body 5. The wing elements 23 and 24 are thus held pivotably about pivot axes $A_1$ and $A_2$ which extend parallel to one another and in the longitudinal direction L, and which extends centrally through the threaded bores 22, situated opposite one another at the end sides, of the main body 5. The pivot arms 25 of the wing elements 23 and 24 are in each case connected to one another by synchronizing means 30, in the present case in the form of intermeshing synchronizing toothings, which has the effect that pivoting movements of the wing elements 23 and 24 about their pivot axes $A_1$ and $A_2$ occur synchronously in each case. The wing elements 23 and 24, at their undersides 31, each define wing element support surfaces 32. In the present case, the wing element support surfaces 32 are each provided with a depression 33, which is of elongate form, extends in the longitudinal direction L and has an oval shape. Other shapes of depression are however basically also possible. On the top side 34 of each wing element 23, 24, there are formed two receiving openings 35, which end a short distance before the underside 31 of the wing elements 23, 24, wherein the receiving openings 35 are arranged substantially on a line in the longitudinal direction L. Magnets 21 are inserted and fastened into the receiving openings 35, in the present case using an adhesive. On the top side 34 of the wing element 23, which faces toward the grub screw 13, there is furthermore formed a grub screw access groove 36, which is positioned so as to allow access to the grub screw 14. On the top side 34 of the other wing element 24, grooves 37 are formed which are aligned with the cable receiving grooves 13 of the main body 5.

The measuring arrangement 1 furthermore comprises a holding rod 38 which is of hollow form and which is fastened by means of an articulated connection 39 to the end side 9 of the main body 5, wherein the articulated connection 39 permits a relative pivoting of the main body 5 and of the holding rod 38 about a holding rod pivot axis $A_3$ extending in the longitudinal direction L. The articulated connection 39 is in the present case in the form of a T-shaped pipe and is fastened using two sealing rings 40, a covering cap 41, which is designed in the manner of a shim washer and which has a collar 42 protruding on one side along its inner circumference, and a fastening screw 39 to the main body 5, which is screwed into a threaded bore (not illustrated) formed on the end side 8 of the main body 4. The contact means feed opening formed by the contact medium channel 19 at the end side 9 of the main body 5 is in this case situated between the threaded bore and the adjacently arranged sealing ring 40, such that contact medium can pass through the holding rod 38 of hollow form, the articulated connection 39 and the contact medium channel 19 into the contact medium receiving depression 18. The holding rod 38 is pushed over a connector 43 of the articulated connection 39, wherein a further sealing ring 40 is arranged between an annular stop 44, which delimits the connector 43, and the holding rod 38. The fastening of the holding rod 38 to the connector 43 is realized by means of a grub screw 14.

The dimensions of the main body 5 and of the wing elements 23, 24 are in the present case selected such that the maximum height H of the testing body 2 in at least one pivoting position of the wing elements 23 and 24, which in the present case is shown in FIG. 1, amounts to no more than 10 mm. The same applies to the dimensions of the articulated connection 39, and to the diameter D of the holding rod 38, such that these do not protrude beyond the testing head 2 when the holding rod 38 is arranged parallel to the main body 5 and to the wing elements 23, 24 in FIG. 1. In the present case, a syringe 45 is detachably fastened to the free end of the holding rod 38, which syringe serves as a contact medium reservoir and feed device.

Figure 6:
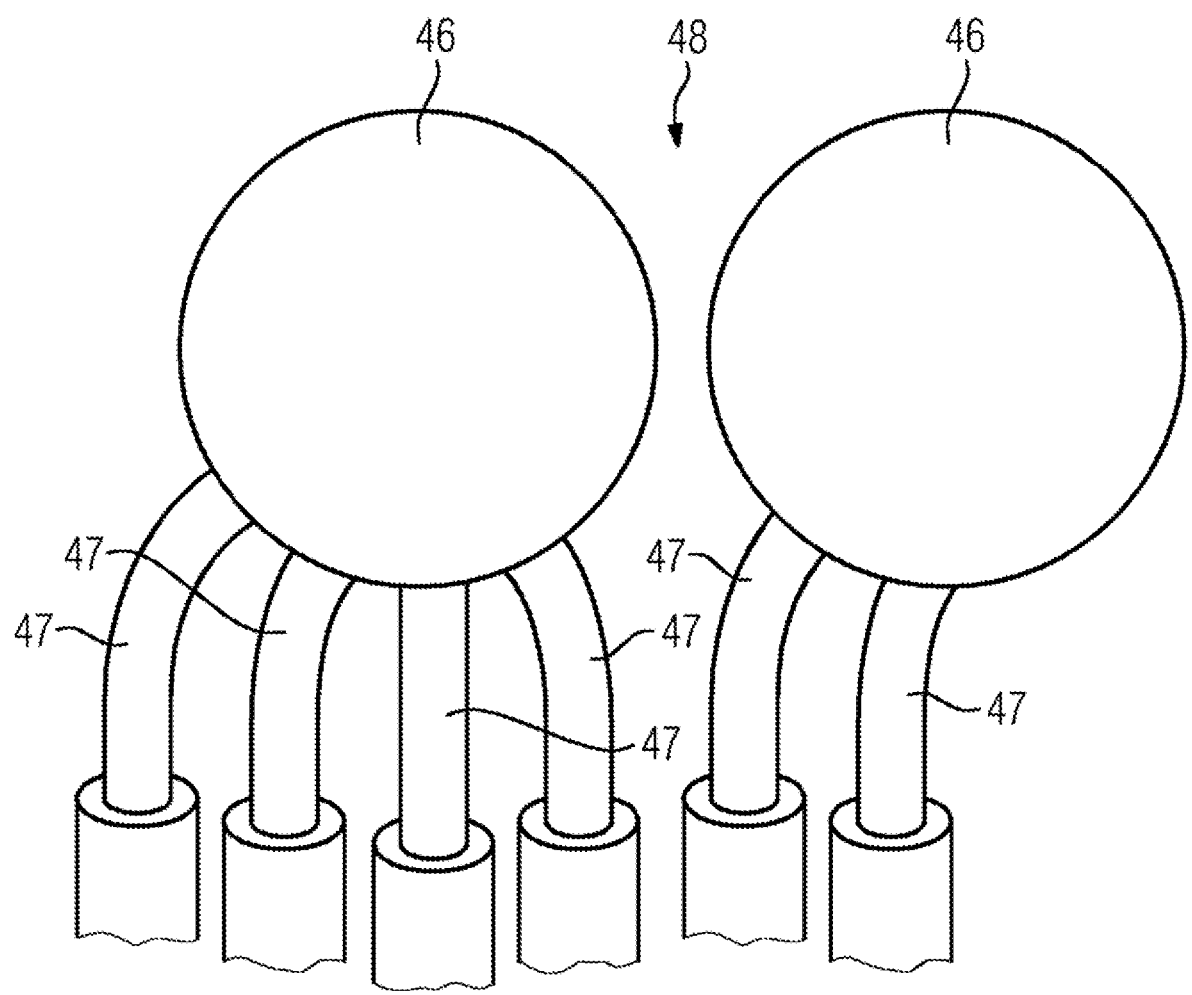
FIG. 6 shows a schematic front view, which shows regions of a heat recovery steam generator of a steam turbine.

FIG. 6 shows two collectors 46 of a heat recovery steam generator of a steam turbine, to which a multiplicity of pipes 47 are connected. The pipes 47 are subject to intense corrosion, for which reason it is necessary to test the wall thicknesses of the pipes 47 at regular intervals in order to reduce the risk of leaks. A problem in the detection of the wall thicknesses of the pipes 47 consists, in the present case, in the fact that the pipes 47 are accessible only via the gap 48 which is present between the collectors 46 and which is only approximately 11 mm wide, resulting in very poor accessibility. There is accordingly the problem that the pipes 47 are poorly visible.

To carry out a wall thickness measurement of one or more of the pipes 47, the testing head 2 is, using the holding rod 38, firstly inserted into the gap 48, which is easily possible owing to the small height of the testing head 2, and is advanced forward to one of the pipes 47. The underside 7 of the main body 5 is subsequently oriented substantially parallel to the pipe surface to be tested and placed in contact therewith. Owing to the magnets 21, both the main body support surface 17 and the wing element support surfaces 32 automatically bear against the surface of the magnetic pipe 47, wherein, owing to the synchronous pivoting movement of the wing elements 23 and 24, the main body support surface 17 and the wing element support surfaces 32 are automatically oriented into a position which is optimal for carrying out the wall thickness measurement. The contact medium is subsequently fed by actuating the syringe 45, whereupon the measurement is performed in a known manner. The signals generated by the ultrasound probe are then supplied via the cables 4 to an evaluation device (not illustrated in any more detail). To carry out further measurements on the same pipe 47, the testing head 2 can be easily pushed along the pipe 47 to the desired positions. In the region of a pipe curve, the depressions 33 provided on the undersides 31 of the wing elements 23 and 24 have a positive effect in that, owing to these depressions 33, at least two-point contact between the wing elements 23 and 24 and the pipe surface is ensured at all times, as long as the shape of the depressions 33 is adapted to the maximum curvature that is present.

In summary, owing to the measuring arrangement according to embodiments of the invention, it is possible to easily detect even the wall thicknesses of poorly accessible and/or poorly visible pipe portions.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A measuring arrangement for detecting a wall thickness of a pipe, comprising:
   a testing head with a main body which receives an ultrasound probe and which, at an underside of main body, defines a main body support surface, wherein the testing head has two wing elements which, at undersides of the two wing elements, define in each case one wing element support surface and which are held on the main body pivotably about pivot axes which extend substantially parallel to one another and in a longitudinal direction, in such a way that the wing element support surfaces can be moved toward one another and away from one another;
   wherein the two wing elements are connected to one another by synchronizing means in the form of intermeshing synchronizing toothings, in such a way that pivoting movements about the associated pivot axes occur synchronously.

2. The measuring arrangement as claimed in claim 1, wherein the ultrasound probe is inserted from above into a passage opening provided in the main body.

3. The measuring arrangement as claimed in claim 1, wherein a contact surface of the ultrasound probe extends substantially parallel and with a small spacing with respect to the main body support surface, further wherein the spacing amounts to less than 1 mm, and in that the main body support surface has a contact means receiving depression which annularly surrounds the contact surface of the ultrasound probe and which is connected, via a contact medium channel which extends through the main body, to a contact medium feed opening of the main body, wherein a depth of the contact medium receiving depression amounts to less than 1 mm.

4. The measuring arrangement as claimed in claim 1, wherein at least one magnet is arranged on the main body support surface and/or on the wing element support surfaces, in each case at least two magnets, which are spaced apart from one another in the longitudinal direction.

5. The measuring arrangement as claimed in claim 1, wherein the wing element support surfaces are each provided with a depression which is elongate and extends in the longitudinal direction.

6. The measuring arrangement as claimed in claim 1, wherein a height of the testing body in at least one pivoting position of the wing elements is no greater than 10 mm.

7. The measuring arrangement as claimed in claim 1, wherein a holding rod is fastened by means of an articulated connection to the main body, wherein the articulated connection permits a relative pivoting of the main body and of the holding rod about a holding rod pivot axis extending in the longitudinal direction.

8. The measuring arrangement as claimed in claim 3, wherein the holding rod and the articulated connection define fluid channels which are fluidically connected to one another and to the contact means feed opening.

9. A method for detecting the wall thickness of the pipe using a measuring arrangement as claimed in claim 1, wherein the pipe is of a heat recovery steam generator of a steam turbine.

* * * * *